(12) United States Patent
Bouvet

(10) Patent No.: US 11,153,352 B2
(45) Date of Patent: Oct. 19, 2021

(54) METHOD FOR PROCESSING AN INCOMING CALL IN A TELECOMMUNICATIONS NETWORK AND TAS SERVER IMPLEMENTING SAME

(71) Applicant: ORANGE, Issy-les-Moulineaux (FR)

(72) Inventor: Bertrand Bouvet, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/768,430

(22) PCT Filed: Nov. 13, 2018

(86) PCT No.: PCT/FR2018/052811
§ 371 (c)(1),
(2) Date: May 29, 2020

(87) PCT Pub. No.: WO2019/106253
PCT Pub. Date: Jun. 6, 2019

(65) Prior Publication Data
US 2020/0389504 A1    Dec. 10, 2020

(30) Foreign Application Priority Data

Nov. 30, 2017 (FR) ...................................... 1761448

(51) Int. Cl.
*H04L 29/08*    (2006.01)
*H04L 29/06*    (2006.01)
(Continued)

(52) U.S. Cl.
CPC ...... *H04L 65/1016* (2013.01); *H04L 41/0806* (2013.01); *H04L 65/1006* (2013.01); *H04Q 3/0045* (2013.01)

(58) Field of Classification Search
CPC ............. H04L 65/1016; H04L 41/0806; H04L 65/1006; H04L 12/1482; H04L 12/2816;
(Continued)

(56) References Cited

U.S. PATENT DOCUMENTS 7,181,401 B2 * 2/2007 Johnson .............. H04L 12/2856
370/353
8,078,166 B2 12/2011 Bultinck et al.
(Continued)

FOREIGN PATENT DOCUMENTS

FR         2882482 A1    8/2016
WO    2013121158 A1    8/2013

OTHER PUBLICATIONS

English translation of the Written Opinion dated Jan. 24, 2019 for corresponding International Application No. PCT/FR2018/052811, filed Nov. 13, 2018.
(Continued)

*Primary Examiner* — Michael Won
(74) *Attorney, Agent, or Firm* — David D. Brush; Westman, Champlin & Koehler, P.A.

(57) ABSTRACT

A method for processing an incoming call to a called terminal in a telecommunications network, implemented by a TAS server in an IMS network. The method includes: interrogating an SDM entity to determine whether the service profile of the user associated with the called terminal contains IN terminating service information; interrogating an SDM entity to determine whether the routing domain to be used to route the call to the called terminal is a circuit or packet type; if the routing domain is a packet type, determining whether the called terminal is effectively reachable in packet mode, and if applicable, via which type of access network; if the service profile contains IN terminating information, allowing the IN terminating service provided for the user of the called terminal to be distinguished
(Continued)

according to the type of access network of the called terminal; and routing the call to the called terminal.

20 Claims, 8 Drawing Sheets

(51) Int. Cl.
*H04L 12/24* (2006.01)
*H04Q 3/00* (2006.01)

(58) Field of Classification Search
CPC .. H04L 29/06278; H04Q 3/0045; H04Q 9/00; H04M 69/24; H04M 65/1046; H04M 47/76; H04W 4/06; H04W 72/12; H04W 88/022; H04W 88/025
See application file for complete search history.

(56) References Cited

U.S. PATENT DOCUMENTS

| | | | | |
|---|---|---|---|---|
| 10,084,700 | B1* | 9/2018 | Malhotra | H04L 65/1006 |
| 2007/0064886 | A1* | 3/2007 | Chiu | H04M 7/0012 |
| | | | | 379/88.17 |
| 2007/0100981 | A1* | 5/2007 | Adamczyk | H04L 69/18 |
| | | | | 709/223 |
| 2008/0162637 | A1* | 7/2008 | Adamczyk | H04L 51/043 |
| | | | | 709/204 |
| 2008/0171531 | A1* | 7/2008 | Vohringer | H04W 4/24 |
| | | | | 455/406 |
| 2010/0103888 | A1* | 4/2010 | Takano | H04L 69/08 |
| | | | | 370/329 |
| 2010/0195542 | A1* | 8/2010 | Li | H04M 7/1235 |
| | | | | 370/271 |
| 2010/0232417 | A1* | 9/2010 | Segre | H04M 7/1235 |
| | | | | 370/352 |
| 2010/0278125 | A1* | 11/2010 | Clair | H04L 65/104 |
| | | | | 370/329 |
| 2011/0249658 | A1* | 10/2011 | Wohlert | H04L 65/1069 |
| | | | | 370/338 |
| 2011/0250895 | A1* | 10/2011 | Wohlert | H04W 4/029 |
| | | | | 455/445 |
| 2013/0171974 | A1* | 7/2013 | Bae | H04L 65/1083 |
| | | | | 455/411 |
| 2015/0141052 | A1* | 5/2015 | Bolin | H04W 64/00 |
| | | | | 455/456.2 |
| 2015/0207847 | A1* | 7/2015 | Kim | H04L 67/306 |
| | | | | 709/204 |
| 2016/0142447 | A1* | 5/2016 | Mufti | H04L 65/1069 |
| | | | | 370/260 |
| 2017/0332281 | A1* | 11/2017 | Bouvet | H04W 76/10 |
| 2017/0347304 | A1* | 11/2017 | Kodaypak | H04L 67/303 |
| 2018/0049275 | A1* | 2/2018 | Agarwal | H04L 65/1069 |
| 2019/0297121 | A1* | 9/2019 | Qiao | H04L 61/2007 |
| 2019/0349209 | A1* | 11/2019 | Badar | H04W 4/24 |
| 2020/0296572 | A1* | 9/2020 | Bachmutsky | H04W 8/205 |

OTHER PUBLICATIONS

International Search Report and Written Opinion dated Jan. 15, 2019 for corresponding International Application No. PCT/FR2018/052811, filed Nov. 13, 2018.
Jih-Wei Tsai et al., "The Technique of IMS Sh interface and its NGN LBS application", Communication Technology (ICCT), 2010 12th IEEE International Conference on, IEEE, Piscataway, NJ, USA, Nov. 11, 2010 (Nov. 11, 2010), pp. 599-602, XP031849982.

* cited by examiner

METHOD FOR PROCESSING AN INCOMING CALL IN A TELECOMMUNICATIONS NETWORK AND TAS SERVER IMPLEMENTING SAME

CROSS-REFERENCE TO RELATED APPLICATIONS

This Application is a Section 371 National Stage Application of International Application No. PCT/FR2018/052811, filed Nov. 13, 2018, which is incorporated by reference in its entirety and published as WO 2019/106253 A1 on Jun. 6, 2019, not in English.

BACKGROUND OF THE INVENTION

The invention falls within the scope of the telecommunications networks and more specifically the telecommunications networks offering Intelligent Network services.

It is recalled that the Intelligent Network services (or IN services) are customized services of an operator that apply to calls whose signaling is standardized.

These Intelligent Network (IN) services are generally distinguished from MMTel services, a standardized 3GPP solution for providing voice, video telephone services and the like on the 2G/3G/4G/5G cellular networks.

The invention is more particularly concerned with the conditions for triggering the Terminating services of an IN upon detection of an incoming call.

It is recalled that a Terminating service (called service) of an IN designates in particular the interception of all or part of the signaling messages of a session received by the input switch (GMSC for Gateway Mobile Switch Center) or application server (TAS for Telephony Application Server) of the nominal network of the called user to transmit said session partially or globally after protocol adaptation to an IN service processing entity which is always located in the nominal network of the called user and which is responsible for applying a specific service logic before giving control to the input switch or application server on this session.

FIGS. 1 to 3 which will now be described illustrate the handling of an incoming call in a mobile network implementing a Terminating IN service in accordance with the current state of the art. By way of illustration, the Terminating IN service described in these figures is the Prepaid service for managing the prepaid mode.

FIG. 1 presents the handling of a call intended for a user in prepaid mode when the called terminal is under 2G/3G cellular coverage but is not registered at the SIP level.

It is recalled that an incoming ISUP (ISDN Signaling User Part) or (Bearer Independent Call Control) call is presented (step (1)), when it arrives in the nominal network, to a GMSC (Gateway Mobile Switch Center) entity. This message includes the MSISDN number of the calling terminal and the MSISDN number of the called terminal.

During a step (2), the GMSC entity sends a MAP SRI (Send Routing Information) request to an SDM (Service Data Management) entity to find out where the called terminal is located. It is recalled that the SDM integrates the HLR (Home Location Register) and the HSS server (Home Subscriber Server).

During a step (3), the SDM checks that there is indeed a user service profile registered for this called MSISDN number. If this is the case, the SDM returns information to the GMSC so that it routes the call towards the SCC-AS (Service Call Continuity Application Server) function of the TAS server. This information includes, in particular, the address of the SCC-AS function, the T-CSI (Terminating Camel Subscription Information) intelligent network mark, a service KEY, the trigger point DP12 and the default handling CONTINUE.

It is recalled that an IN service mark defines the set of the parameters for triggering this IN, including (i) the address of the gsm-SCF (Global System Mobile-Service Control Function) platform for processing the service logic and (ii) the Service Key identifying the service logic which must be invoked in this platform and (iii) TDP (Trigger Detection Point) list identifying the detection point of the automatic calling machine BCSM (Basic Call State Machine) on which the triggering of the IN service must occur and (iiii) the Default Call Handling which indicates whether the call should be continued or released in the event of an error during a dialogue between the gsm-SSF (Global System Mobile-Service Switching Function) and the gsm-SCF (Global System Mobile-Service Control Function).

The GMSC triggers via its gsm-SSF function the routing of the call towards the SCC-AS function of the TAS server which acts as a gsm-SCF (step (4) and the TAS server checks whether the MSISDN number of the called party is registered at the SIP.

In the scenario of FIG. 1, the called terminal is not registered at the SIP. In other words, the called terminal is not under 4G (VoLTE) or Wifi (VoWiFi) coverage but attached to a 2G/3G cellular network. Consequently, the TAS server replies that the MSISDN number of the called terminal is not registered in the IMS core network and asks (step (5)) the GMSC to continue the call in circuit mode via the response CAMEL CONTINUE.

In step (6), the GMSC having received the profile of the user in step (3) determines that the called terminal is in prepaid mode because it is currently located in a visited country and therefore that the call termination between the nominal country and the visited country should be charged thereto. It consults, via its gsm-SSF function, the intelligent network platform PREPAID to check the balance of the account of the user of the called terminal. The intelligent network platform PREPAID replies (step 7), depending on the status of the account, with a message of the type:

CONTINUE to continue the call if the status of the account allows it; or

CONNECT to redirect the call towards a voice resource configured to indicate the user how to recharge his prepaid account;

RELEASE to interrupt the call.

If the balance of the prepaid account allows it, the GSMC interrogates (step (8)) the HLR entity to obtain an internationally routable number of the called terminal. The SDM sends (step (9)) a request to the V-MSC switch (Visited Mobile Switch Center) which had previously downloaded the user's profile from the SDM when the called terminal has hooked in 2G, 3G from the V-MSC.

In step (10), the V-MSC issues to the SDM the routable number of the called terminal. It is recalled that this internationally routable number is a number temporarily issued by the V-MSC, among a set of numbers managed by this V-MSC.

In step (11), the SDM provides this routable number to the GMSC which routes (step (12)) the call in ISUP/BICC up to the V-MSC on which the called terminal is attached. The V-MSC finds the terminal in the cells it manages by a paging mechanism and presents the call to the called terminal.

The call is then supervised by the IN platform PREPAID and if the user's communication credit is exhausted, the GMSC then triggers the disconnection of the called terminal and sends a call interruption message (of RELEASE type) to the calling terminal.

FIG. 2 presents the routing of an incoming call towards a called terminal when the called terminal is connected in packet mode and under 2G/3G cellular coverage, according to the state of the art.

In this scenario, if the called terminal is registered in VoWiFi in parallel with its 2G/3G connection, therefore in SIP, this called terminal is registered in the TAS server. Consequently, when the SCC-AS function of the TAS server is interrogated by the GMSC in step (4), the TAS server replies in step (5) to the GMSC in CAP protocol "CONNECT" by using a specific routing identifier such as a prefix before the called MSISDN number. The GMSC then routes based on this prefix (step (6)) the call towards the I-CSCF (Interrogating Call State Control Function) in SIP protocol according to the prefix suppression mechanism known to those skilled in the art. The GMSC, via its MGCG function (Media Gateway Control Function) sends for this purpose to the I-CSCF entity a SIP message INVITE including the MSISDN number of the called terminal.

In steps (7) and (8), the I-CSCF entity interrogates the HSS part of the SDM to obtain the address of the S-CSCF (Serving-Call State Control Function) entity on which the called terminal is registered, via its MSISDN number.

In step (9), the I-CSCF routes the call towards this S-CSCF. It is recalled that the S-CSCF has previously downloaded from the HSS the IMS profile of the called terminal during the Initial SIP registration phase of this terminal.

The S-CSCF then triggers (step (10)) the sending of a message INVITE to the TAS server.

In step (11), the TAS server asks the SDM whether the user of the called terminal has Terminating Intelligent Network (IN) marks. In step (12), the SDM replies that the user does actually have IN marks PREPAID.

In step (13), the IM-SSF function (IP Multimedia-Service Switching Function) of the TAS server triggers the Terminating IN service. The intelligent network platform confirms (step (14)), based on the MSISDN number, that the user's prepaid account is sufficiently credited for the call to be authorized.

In step (15), the T-ADS (Terminating Domain Access Selection) function of the TAS server interrogates the SDM to determine the routing domain of the incoming call either towards the PS packet mode VoLTE or VoWiFi or towards the 2G/3G circuit mode.

The called terminal being registered in VoWiFi, the SDM indicates (step (16)) to route the call in PS (Packet Switch) mode, via the IMS core.

The TAS server sends (step (17)), the message INVITE to the S-CSCF; the S-CSCF routes the call towards the P-CSCF (Proxy Call State Control Function) and the P-CSCF routes the call towards the called terminal. The call is then supervised by the IN platform PREPAID and if the user's communication credit is exhausted, the TAS then triggers the disconnection of the called terminal and sends a call interruption message (BYE type) to the MGCF of the GMSC which in turn interrupts the call with the caller to the calling terminal by sending an ISUP/BICC message (of Release type).

With reference to FIG. 3, it is assumed that the called terminal, previously registered at the core of the IMS network, has lost the packet coverage. This is for example the case of a VoWiFi terminal which has just lost the link with the WiFi access point but which is still registered in SIP in the S-CSCF and in the TAS, typically for a duration of one hour, corresponding to the duration EXPIRES between two subsequent registrations REGISTER.

In the case of an incoming call intended for this terminal, in step (15), the T-ADS function of the TAS server determines that the Terminating domain of the called terminal is the circuit domain and that the call must be routed in circuit mode.

Under these conditions, the TAS server obtains the international routing address of the called terminal by interrogating the SDM (steps (17) to (20)) then routes (step (21)) the message INVITE to the S-CSCF. The S-CSCF sends the message INVITE to the MGCF of the V-MSC which performs the SIP translation towards ISUP/BICC and the call is routed from the V-MSC towards the conventionally called terminal.

It appears from the description of FIGS. 1 to 3, that the Terminating IN services are systematically triggered, regardless of the connection status of the terminal of the called user.

This situation is not satisfactory. The invention therefore relates to a mechanism allowing an operator to set up a differentiated Terminating service offer.

OBJECT AND SUMMARY OF THE INVENTION

Thus, according to a first aspect, the invention relates to a method for handling an incoming call intended for a called terminal in an IMS-type telecommunications network. This method is implemented by a TAS server and includes:
- a step of interrogating an SDM entity to determine whether the service profile of the user associated with the called terminal has Terminating IN service marks;
- a step of interrogating an SDM entity to determine whether the routing domain to be used to route the call towards the called terminal is of the circuit or packet type;
- if said routing domain is of packet type, a step of determining whether the called terminal is actually reachable in packet mode, and if so, via which type of access network; and
- if the service profile of said user has Terminating IN marks, a step for differentiating the Terminating IN service provided to the user of the called terminal depending on the type of access network of the called terminal.
- a step of routing the call towards the called terminal.

Correlatively, the invention relates to a TAS server configured to handle an incoming call intended for a called terminal in an IMS network. This server includes:
- a unit configured to interrogate an SDM entity to determine whether the service profile of the user associated with the called terminal has Terminating IN service marks;
- a unit configured to interrogate an SDM entity to determine whether the routing domain to be used to route the call towards the called terminal is of the circuit or packet type;
- a unit for checking the reachability of the called terminal configured to determine, when the routing domain is of packet type, whether the called terminal is actually reachable in packet mode, and if so, via which type of access network; and
- a unit for differentiating a Terminating IN service configured, in the case where said user has Terminating IN service marks, to allow differentiating the Terminating IN service provided to the user of the called terminal depending on the type of access network of the called terminal; and a unit for routing the call towards the called terminal.

Thus, in general, the invention proposes to determine the type of access network to which a called terminal is attached before triggering a Terminating IN service logic, and to differentiate the Terminating IN service to be provided to the user of this terminal depending on the type of access network.

The invention consequently proposes to anticipate the T-ADS function in order to activate, deactivate or adapt a Terminating IN service logic.

In a first variant, the step for differentiating the Terminating IN service provided to the user of the called terminal depending on the type of access network consists in triggering or not the Terminating IN service depending on the type of access network of the called terminal.

In a second variant, the step for differentiating the Terminating IN service provided to the user of the called terminal depending on the type of access network includes the systematic triggering of the Terminating IN service by sending to the IN service execution platform the type of access network of the called terminal, the platform being configured to implement a differentiated service logic depending on the type of access network.

In a particular embodiment of the invention, the step of determining whether the called terminal is actually reachable in packet mode and, if so, via which type of access, includes:

sending a SIP message to the called terminal, for example a SIP-type message OPTIONS;

waiting for a response, for a predetermined period, to determine whether said called terminal is reachable; and in case of a response:

determining the type of access network from a SIP PANI (Private Access Network Information) field comprised in the response.

In a particular embodiment of the invention, in order to differentiate the Terminating IN service provided to the user of the called terminal:

when the called terminal is reachable under cellular coverage, the country code, the operator code or the standardized cell identifier comprised in the SIP PANI field, are also taken into account;

when the called terminal is reachable in VoWiFi, the location of the WiFi access point to which the called terminal is connected is also taken into account, the location of the access point being obtained from the IP address and/or from the MAC address of said access point.

The invention thus allows an operator to decide in particular to trigger, not to trigger, or to trigger a differentiated Terminating IN service:

depending on whether the called terminal is attached to a cellular network (2G, 3G, 4G) or in WiFi;

depending on the type of cellular network, for example 2G/3G versus 4G; and even, depending on the country, the operator or the cell of the network in which the called terminal is located, depending on the location of the WiFi network used by the called terminal.

The invention can in particular be used not to trigger the supervision of a call by a Terminating IN platform when the called terminal is actually under WiFi coverage.

This embodiment is particularly advantageous in the case of an IN service PREPAID because it allows an operator not to reduce the communication credits of a user in prepaid mode, when the latter receives a call in roaming abroad, while its terminal is in VoWiFi.

The characteristics and advantages of the TAS server according to the invention are identical to the characteristics and advantages of the method for handling an incoming call described above.

Therefore:

In the first variant, the unit for differentiating a Terminating IN service of the TAS server according to the invention is configured to trigger or not the Terminating IN service depending on the type of access network of the called terminal.

in the second variant, the unit for differentiating a Terminating IN service of the TAS server according to the invention is configured to systematically trigger the Terminating IN service by sending to the IN service processing platform the type of access network of the called terminal, the platform being configured to implement a differentiated service logic depending on the type of access network.

According to a third aspect, the invention also relates to a system including:

a TAS server as mentioned previously; and an IN platform configured to implement a terminating service logic depending on the type of access network received from the TAS server.

In a particular embodiment, the different steps of the method for handling an incoming call according to the invention are determined by computer program instructions.

Consequently, the invention also relates to a computer program, on an information medium, this program including instructions adapted for the implementation of the steps of a method for handling an incoming call according to the invention.

This program can use any programming language, and be in the form of source code, object code, or intermediate code between source code and object code, such as in a partially compiled form, or in any other desirable form.

The invention also relates to an information medium readable by a computer, and including instructions of a computer program as mentioned above.

The information medium can be any entity or device capable of storing the program. For example, the support may include a storage means, such as a ROM, for example a CD ROM or a microelectronic circuit ROM, or also a magnetic recording means, for example a hard disk.

On the other hand, the information medium can be a transmissible medium such as an electrical or optical signal, which can be conveyed via an electrical or optical cable, by radio or by other means. The program according to the invention can in particular be downloaded from an Internet-type network.

Alternatively, the information medium can be an integrated circuit in which the program is incorporated, the circuit being adapted to execute or to be used in the execution of the method in question.

BRIEF DESCRIPTION OF THE DRAWINGS

Other characteristics and advantages of the present invention will emerge from the description given below, with reference to the appended drawings which illustrate an exemplary embodiment thereof devoid of any limiting character. In the figures.

DETAILED DESCRIPTION OF A FIRST VARIANT OF THE INVENTION

Figure 1:
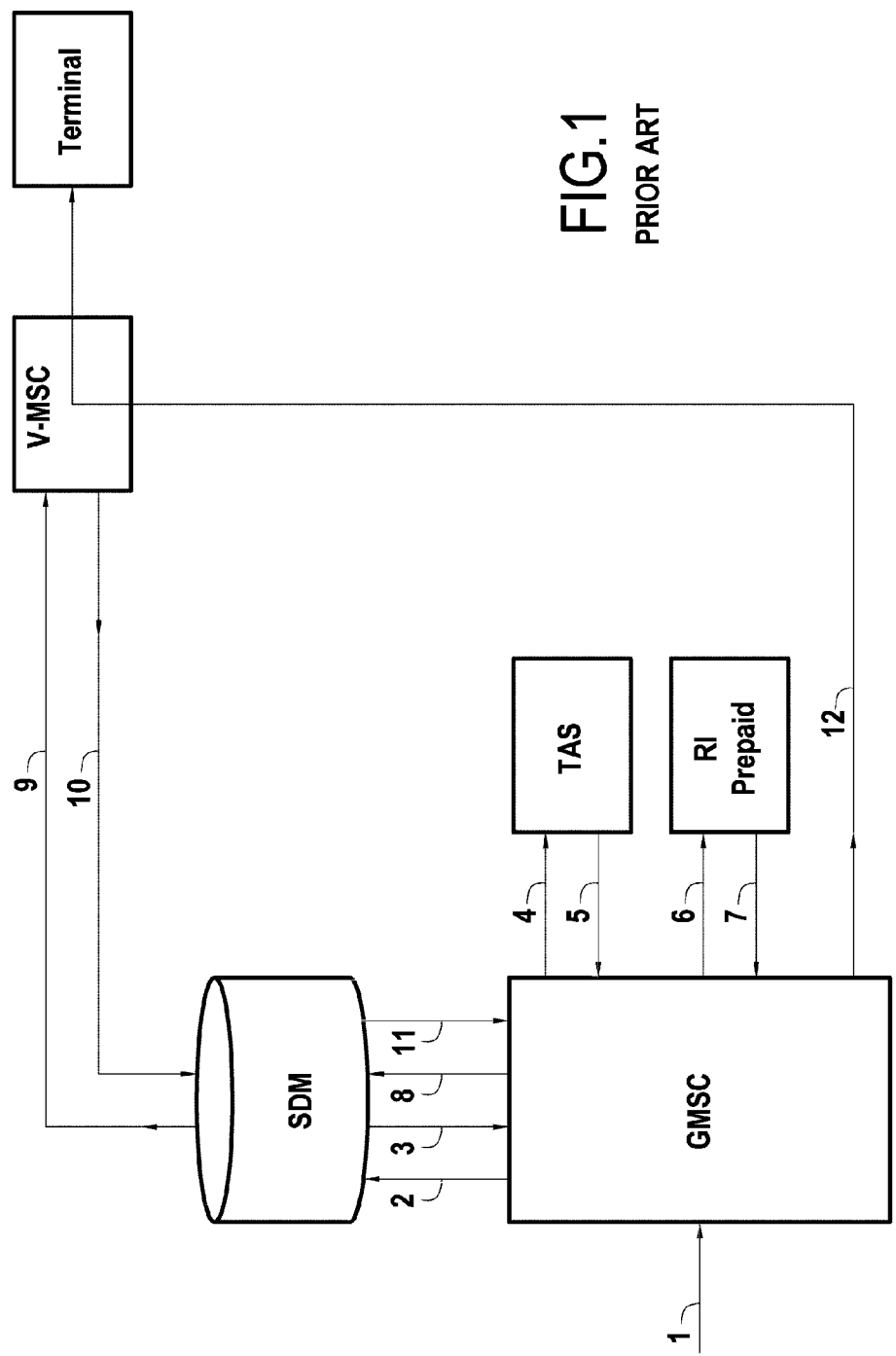
FIG. 1 already described presents the handling of an incoming call intended for a user benefiting from a service in prepaid mode in accordance with the current state of the art, when the called terminal is under 2G/3G cellular coverage and is not registered at the SIP.
Figure 2:
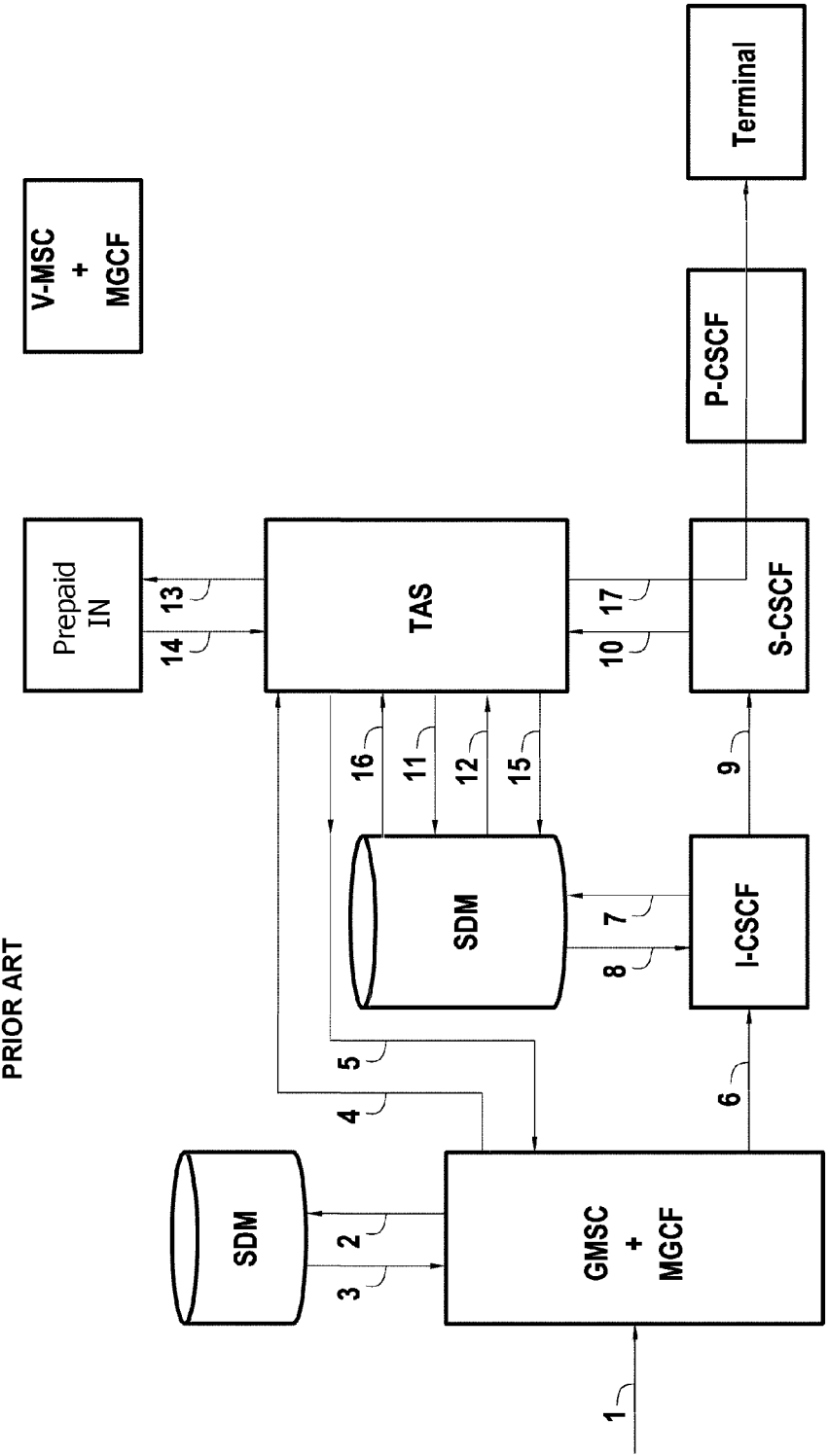
FIG. 2 already described presents the routing of an incoming call towards a called terminal when the called terminal is connected in packet mode and under 2G/3G cellular coverage, in accordance with the state of the art.
Figure 3:
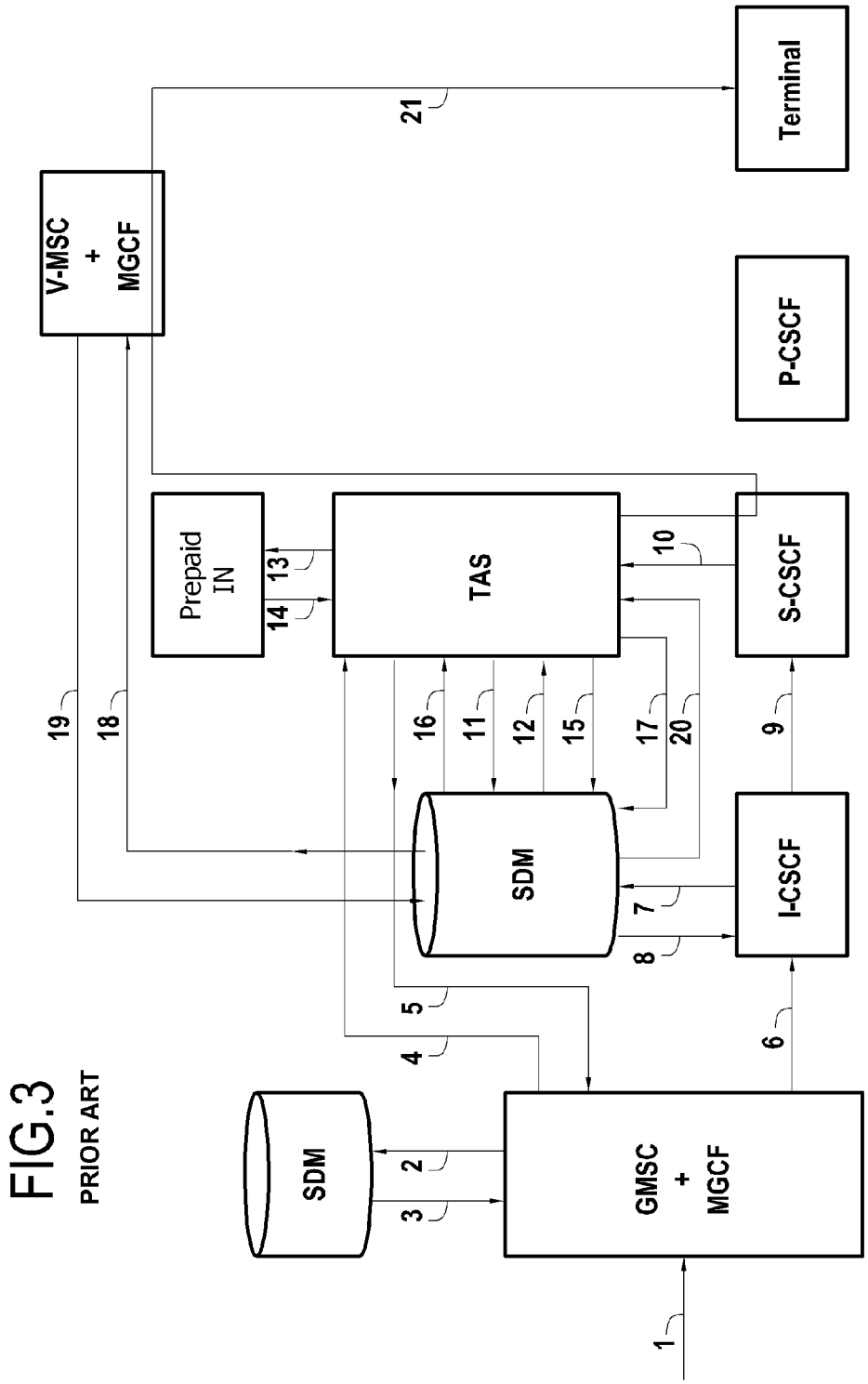
FIG. 3 already described illustrates the handling of the incoming call when the called terminal, previously registered at the core of the IMS network, has lost the packet coverage; in accordance with the state of the art.
Figure 4:
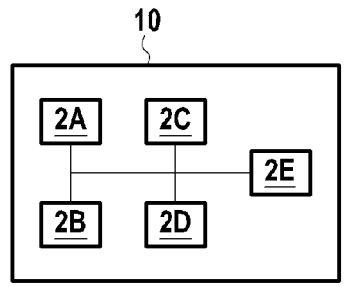
FIG. 4 represents schematically a TAS server according to a particular embodiment of the invention.
Figure 5:
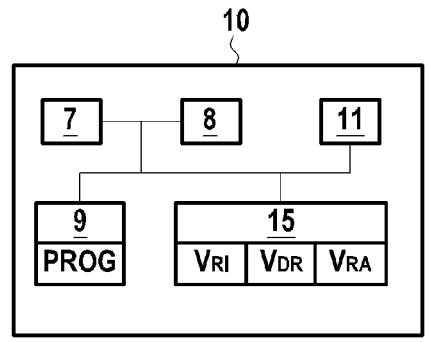
FIG. 5 illustrates the hardware architecture of a TAS server according to a particular embodiment of the invention.

FIG. 4 represents a TAS server 10 according to a particular embodiment of the invention. In the first embodiment described here, this TAS server has the architecture of a computer, as illustrated in FIG. 5. It comprises in particular a processor 7, a random access memory 8, a read-only memory 9, a non-volatile flash memory 15 as well as communication means 11. Such means are known per se and are not described in more detail here.

The read-only memory 9 of the device of the entity 10 for managing user profiles constitutes a recording medium according to the invention, readable by the processor 7 and on which a computer program PROG is recorded here according to the invention.

The computer program PROG defines functional and software modules here, configured to implement the steps of a method for handling an incoming call. These functional modules are based on and/or control the hardware elements 7-11 and 15 of the entity 10 mentioned above. They comprise in particular here, as illustrated in FIG. 4:

- a unit 2A configured to interrogate an SDM entity to determine whether the service profile of a user has Terminating IN service marks;
- a unit 2B configured to interrogate an SDM entity to determine whether the routing domain to be used to route a call is of the circuit or packet type;
- a unit 2C for checking the reachability of the called terminal configured to determine, when said routing domain is of the packet type, whether the called terminal is actually reachable in packet mode, and if so, via which type of access network;
- a unit 2D for differentiating a Terminating IN service configured, in the case where the user of the called terminal has Terminating IN service marks, in order to allow differentiating the Terminating IN service provided to the user of the called terminal depending on the type of access network of the called terminal; and
- a unit 2E for routing the call towards said called terminal.

In one embodiment of the invention, the unit 2D for differentiating the Terminating IN service is configured to trigger or not said Terminating IN service depending on the type of access network.

In another embodiment of the invention, the unit 2D for differentiating the Terminating IN service is configured to systematically trigger the Terminating IN service by sending to the IN service processing platform the type of access network of the called terminal. In this embodiment, the Terminating IN service processing platform is configured to implement a differentiated service logic depending on the type of access network of the called terminal.

Figure 6:
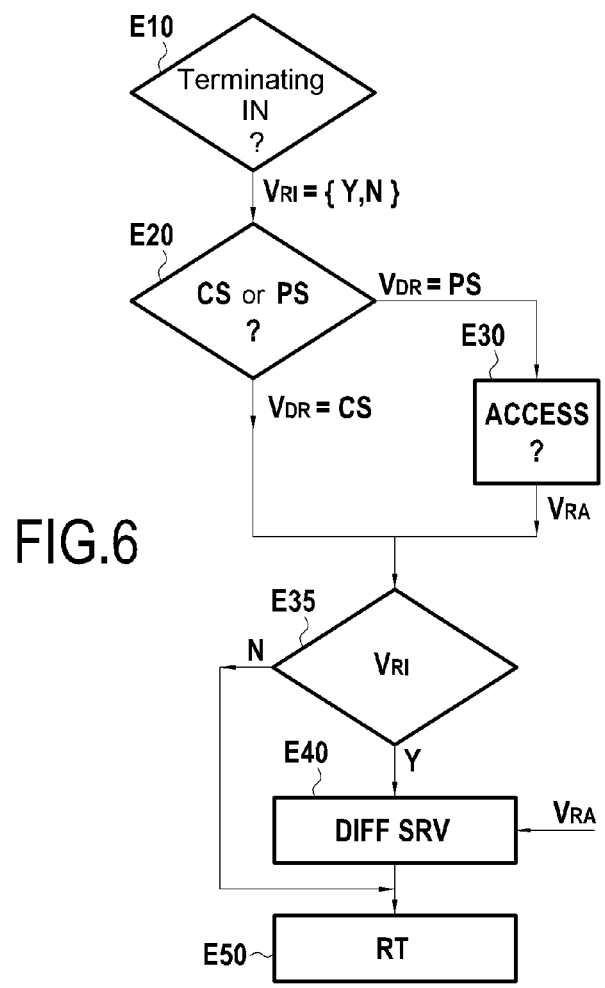
FIG. 6 represents in flowchart the main steps of a method for handling an incoming call according to the invention.

FIG. 6 represents in the form of a flowchart the main steps of a method for handling an incoming call according to the invention.

This method can be implemented by the TAS server in FIG. 4.

This method includes a step E10 during which the TAS server interrogates the SDM entity to determine whether the service profile of the user associated with said called terminal has Terminating IN service marks. The result of this interrogation is recorded in a variable $V_{RI}$ stored in the memory 15. This variable $V_{RI}$ is initialized to "Y" if the service profile of the user has Terminating IN service marks and to "N" otherwise.

During a step E20, the TAS server interrogates an SDM entity to determine the circuit or packet routing domain to be used to route the call towards said called terminal. The PS/CS result of this interrogation is recorded in a variable $V_{DR}$ stored in the memory 15.

If said routing domain is of the packet type, step E20 is followed by a step E30 during which the TAS server determines whether the called terminal is actually reachable in packet mode, and if so, via which type of access network. The type of access network is recorded in a variable $V_{RA}$ stored in the memory 15.

During a step E35, the TAS server checks whether the service profile of the user has Terminating IN service marks depending on the content of the variable $V_{RI}$ initialized in step E10.

If this is the case, the Terminating IN service is differentiated during a step E40 depending on the type of access network of the called terminal stored in the variable $V_{RA}$.

Then the call is routed towards the called terminal during a step E50.

Figure 7:
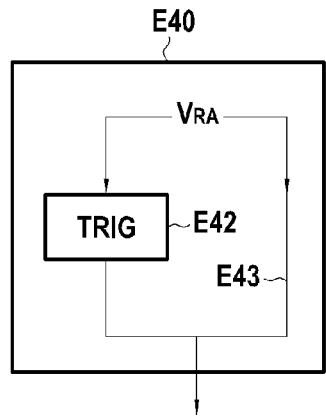
FIGS. 7 and 12 represent two mechanisms for differentiating a Terminating IN service according to the invention.

In the first variant of the invention, and as illustrated in FIG. 7, step E40 for differentiating the Terminating IN service provided to the user of the called terminal depending on the type of access network consists in: triggering (step E42) or not (E43) the Terminating IN service depending on the type of access network (variable $V_{RA}$).

Figure 8:
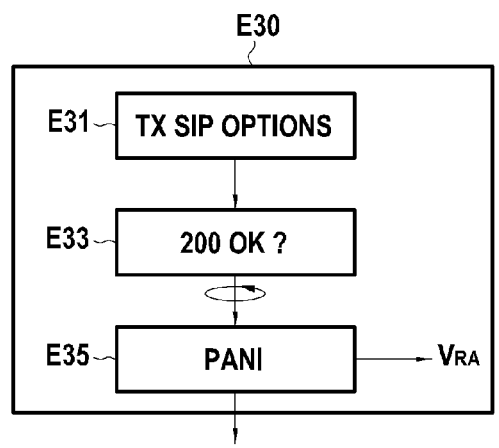
FIG. 8 represents a mechanism for determining whether the called terminal is actually reachable in packet mode and if so, via what type of access, according to the invention.

In a particular embodiment, and as illustrated in FIG. 8, step E30 to determine whether the called terminal is actually reachable in packet mode and if so, via which type of access, includes:

- sending E31 a SIP message to the called terminal;
- waiting E33 for a response, for a predetermined period, to determine whether said called terminal is reachable; and in case of response:
- determining E35 said type of access network (variable $V_{RA}$) and possibly:

(i) the country code, the operator code or the cell identifier from a SIP PANI field comprised in the response in the case where the called terminal is reachable under cellular coverage; and (ii) the IP address and the MAC address of the WiFi access point in the case where the called terminal is reachable in VoWiFI. In the latter case, the TAS can in a known manner consult an IP address and/or MAC address geolocation base to find the location (country) of the WiFi access point.

Figure 9:
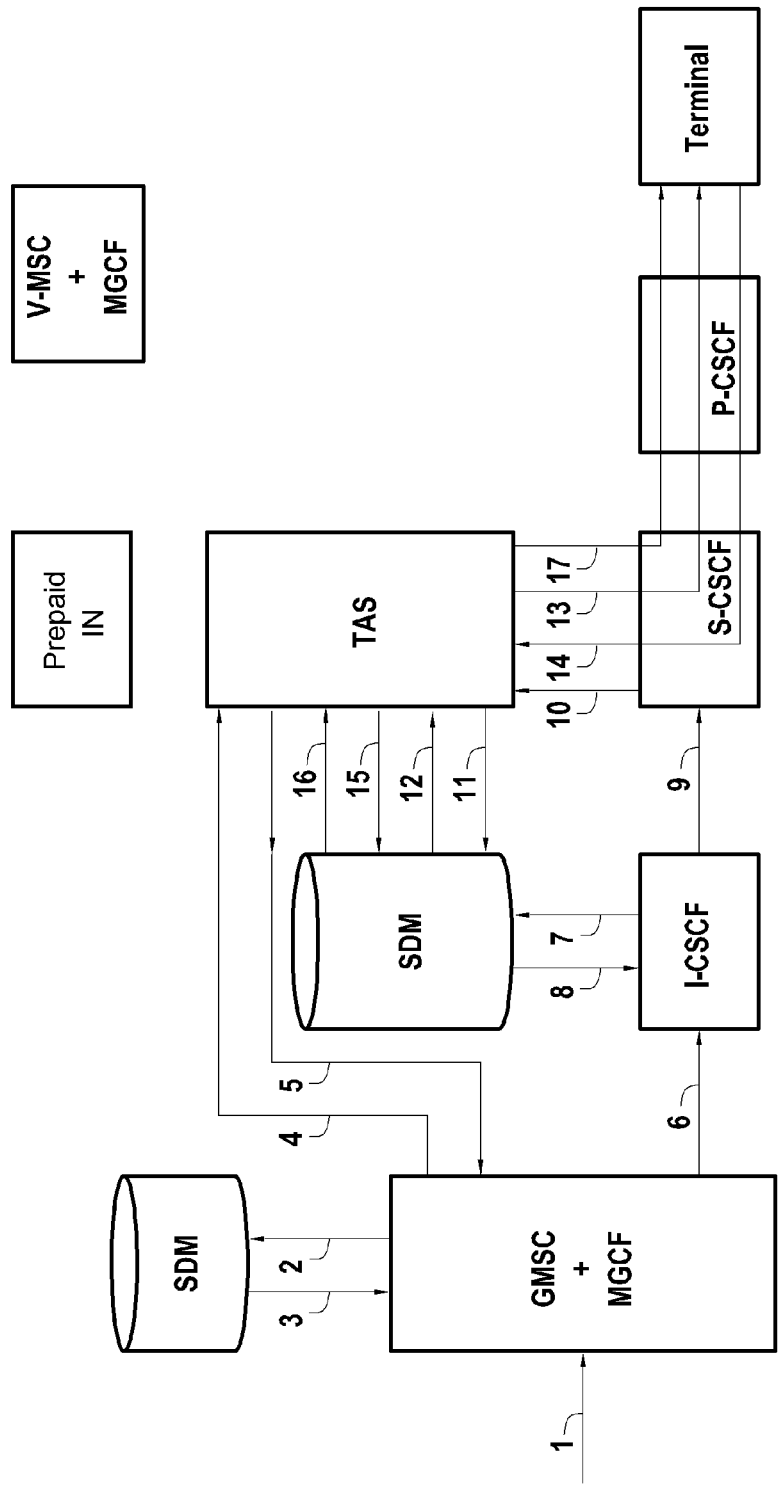
FIG. 9 illustrates an example of implementation of the invention when the called terminal is under WiFi coverage.

FIG. 9 presents an example of implementation of the invention when the called terminal is actually under WiFi coverage.

According to the invention, before triggering the Terminating IN Prepaid service, the TAS server sends (step (13)) a SIP message OPTIONS to the called terminal. If the called terminal replies to this message (typically with a response 200 OK), the TAS server determines:

(i) with certainty that the called terminal is always reachable via a packet-type routing domain (PS for Packet Switch); and (ii) the type of access network of the called terminal by analysis of the PANI field comprised in the response 200 OK.

In the example of FIG. 9, the TAS server according to the invention decides not to trigger the intelligent network Terminating service if it determines that the called terminal is in VoWiFi.

This embodiment is particularly advantageous because it allows the operator not to reduce the communication credits of a user in prepaid mode when he receives a call in roaming abroad while his terminal is in VoWiFI.

In the embodiment described here, the conventional algorithm for selecting the call termination domain conventionally applies in steps (15) and (16). These steps will confirm that the terminal is reachable via the PS packet domain but the call will not be supervised by the Terminating IN network logic. The conventional algorithm for selecting the call termination domain could equally well be executed before step (13) of determining the reachability of the called terminal via the packet mode. Likewise, the algorithm for selecting the call termination domain might as well not be applied, for example when the called terminal is detected as registered and reachable in VoWiFi.

Figure 10:
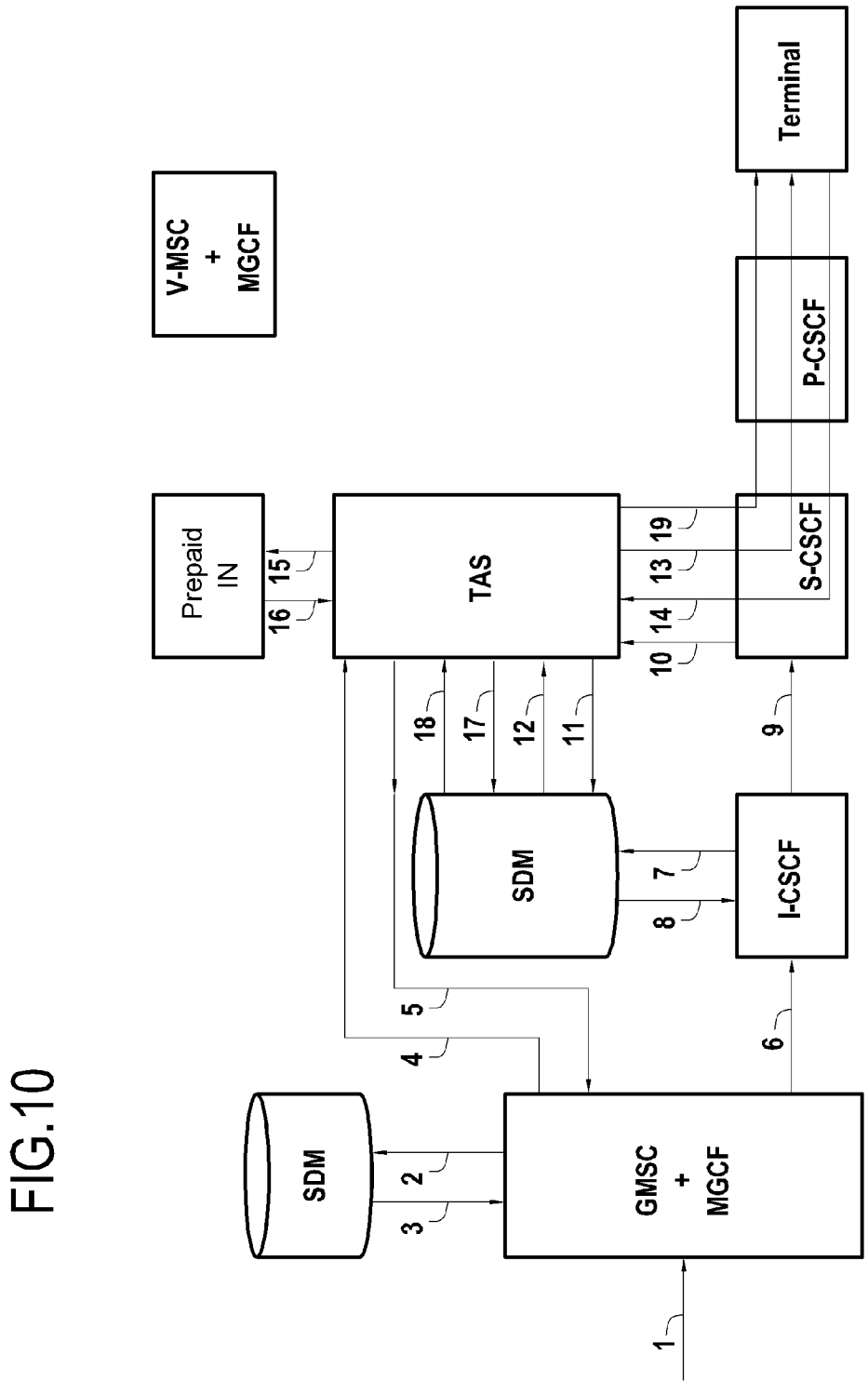
FIG. 10 illustrates an example of implementation of the invention when the called terminal is attached to a 4G UTRAN network of a foreign country.

FIG. 10 illustrates the case where the TAS server determines in step E30, by analysis of the SIP PANI field received in the response 200 OK to the SIP message OPTIONS, that the called terminal is attached to a 4G UTRAN network of a foreign country via the standardized cell country identifier MCC (Mobile Country Code).

In the example of implementation of FIG. 10, the TAS server according to the invention decides (steps (15) and (16)) to trigger the Terminating intelligent network service via its IM-SSF function.

The TAS server can also decide to trigger the Terminating intelligent network service if it receives, in response to the SIP message OPTIONS sent to the called terminal in step (13), a response 200 OK/486 Busy Here mentioning a SIP PANI field with GERAN (2G) or UTRAN (3G) access representative of the fact that the called terminal is attached to a cellular network.

Figure 11:
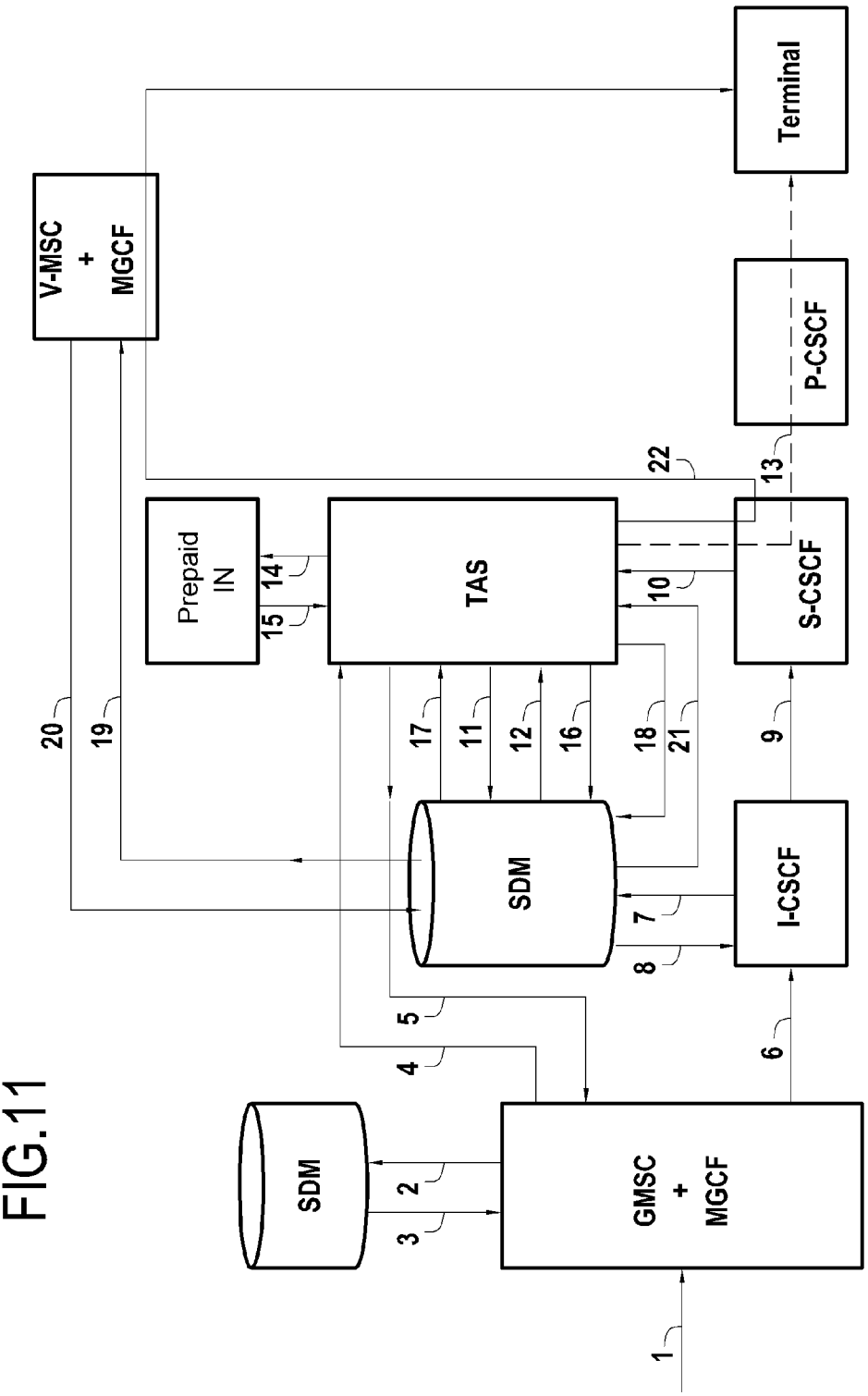
FIG. 11 illustrates an example of implementation of the invention when the called terminal has lost the 4G or WiFi network coverage.

FIG. 11 falls within the scope in which the called terminal is still registered at the core of the IMS network but has lost the 4G or WiFi network coverage when the TAS server sends the SIP message OPTIONS thereto in step (13).

In this case, the TAS server does not receive a response to the sending of this SIP message OPTIONS because the called terminal is no longer reachable. In the embodiment described here, the TAS server triggers the Terminating IN services (steps (14), (15)) and the routing is done conventionally by default via the 2G, 3G network in circuit mode.

Description of a Second Variant of the Invention

Figure 12:
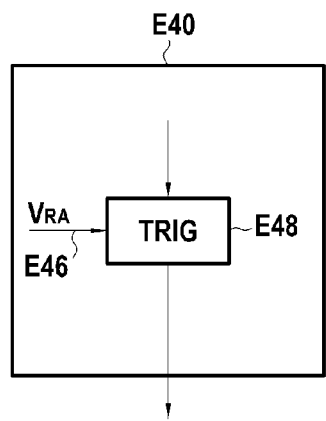

In a second variant of the invention, and as illustrated in FIG. 12, step E40 for differentiating the Terminating IN service provided to the user of the called terminal according to said type of access network includes the systematic triggering (step E48) of the Terminating IN service by sending (step E46) to the execution platform of the IN service the type of access network of the called terminal (variable $V_{RA}$), the platform being configured to implement a logic of said service differentiated depending on said type of access network.

Other Embodiments of the Invention

In the embodiments described above, the TAS server determines the access network of the called terminal after having determined that the service profile of the user associated with the called terminal has Terminating IN service marks. These steps can be reversed, but it is preferable to determine the access network of the called terminal only when the latter benefits from Terminating IN services so as not to overload the network.

In the embodiments described above, the case of an incoming call arriving from a caller in circuit mode has been described. The invention applies in the same way in the case of a caller from the same IMS network core or from another IMS core via an interconnection mechanism in VoIP.

In the embodiments described above, the anchoring procedure in the IMS network is carried out when the called terminal is registered in SIP in the IMS network core. The invention applies in the same way if the anchoring procedure is carried out systematically, in other words whether the called terminal is registered or not in SIP at the core of the IMS network.

In the embodiments described above, the anchoring procedure in the IMS network is carried out by intelligent network mark CAMEL. It can also be done by deploying the ICS (IMS Centralized Service) mode via a standardized interface I2/I3 from the MSC/GMSC to the IMS core.

These different variants are known to those skilled in the art and standardized.

The called terminal does not have to be registered in SIP at the core of the IMS network for the invention to be implemented. Indeed, as soon as an incoming call is held by the IMS network core, if the called terminal is not registered in SIP at the S-CSCF server, this S-CSCF server downloads on itself the profile of the triggering of the TAS server in the HSS/HLR/SDM, this profile defining the systematic routing of all incoming and outgoing SIP messages INVITE towards the TAS server.

The invention claimed is:

1. A handling method comprising:
  handling an incoming call intended for a called terminal in a telecommunications network, by a Telephony Application Server (TAS) server in an Internet Protocol Multimedia Subsystem (IMS) network, the handling including:
  interrogating a Service Data Management (SDM) entity to determine whether a service profile associated with said called terminal has Terminating Intelligent Network (IN) service marks;

interrogating an SDM entity to determine whether a routing domain to be used to route the call towards the called terminal is of a circuit or packet type; and routing the call towards said called terminal;

in response to said routing domain being of the packet type, determining whether said called terminal is actually reachable in packet mode, and if so, via which type of access network; and in response to the service profile having Terminating IN marks, differentiating the Terminating IN service provided to said called terminal depending on the type of access network of the called terminal.

2. The handling method according to claim 1, wherein said differentiating the Terminating IN service provided to said called terminal depending on said type of access network comprises triggering or not said Terminating IN service depending on said type of access network.

3. The handling method according to claim 1, wherein said differentiating the Terminating IN service provided to said called terminal depending on said type of access network includes systematically triggering the Terminating IN service by sending to an IN service execution platform the type of access network of the called terminal, the platform being configured to implement a differentiated service logic depending on said type of access network.

4. The handling method according to claim 1, wherein said determining whether the called terminal is actually reachable in packet mode and if so, via which type of access, includes:

sending a SIP message to the called terminal;

waiting for a response, for a waiting period, to determine whether said called terminal is reachable; and in case of a response:

determining said type of access network from a SIP PANI field comprised in said response.

5. The handling method according to claim 4, wherein in order to differentiate the Terminating IN service provided to said called terminal, when said called terminal is reachable under cellular coverage, a country code, an operator code or a standardized cell identifier comprised in said SIP PANI field, are also taken into account.

6. The handling method according to claim 4, wherein, in order to differentiate the Terminating IN service provided to said called terminal, when said called terminal is reachable in VoWiFi, a location of a WiFi access point to which said called terminal is connected is also taken into account, said location being obtained from an IP address and/or from a MAC address of said access point.

7. The handling method according to claim 4, wherein said SIP message sent to the called terminal is a SIP-type message OPTIONS.

8. A Telephony Application Server (TAS) server configured to handle an incoming call intended for a called terminal in an Internet Protocol Multimedia Subsystem (IMS) network, said server including:

a processor: and a non-transitory computer-readable medium comprising instructions stored thereon, which when executed by the processor configure the TAS server to:

interrogate a Service Data Management (SDM) entity to determine whether a service profile associated with said called terminal has Terminating Intelligent Network (IN) service marks;

interrogate an SDM entity to determine whether a routing domain to be used to route the call towards the called terminal is of a circuit or packet type; and route the call towards said terminal;

determine, in response to said routing domain being of packet type, whether said called terminal is actually reachable in packet mode, and if so, via which type of access network;

differentiate a Terminating IN service configured, in the case where said service profile has Terminating IN service marks, to allow differentiating the Terminating IN service provided to the called terminal depending on the type of access network of the called terminal.

9. The TAS server according to claim 8, the differentiating a Terminating IN service triggers or not said Terminating IN service depending on said type of access network.

10. The TAS server according to claim 8, wherein the differentiating a Terminating IN service systematically triggers the Terminating IN service by sending to an IN service processing platform the type of access network of the called terminal, the platform being configured to implement a differentiated service logic depending on said type of access network.

11. A system including:

the TAS server according to claim 10; and an IN platform configured to implement a logic of said terminating IN service depending on the type of access network received from said TAS server.

12. The TAS server according to claim 8, wherein said determining whether the called terminal is actually reachable in packet mode and if so, via which type of access, includes:

sending a SIP message to the called terminal;

waiting for a response, for a waiting period, to determine whether said called terminal is reachable; and in case of a response:

determining said type of access network from a SIP PANI field comprised in said response.

13. The TAS server according to claim 12, wherein in order to differentiate the Terminating IN service provided to said called terminal, when said called terminal is reachable under cellular coverage, a country code, an operator code or a standardized cell identifier comprised in said SIP PANI field, are also taken into account.

14. The TAS server according to claim 12, wherein, in order to differentiate the Terminating IN service provided to said called terminal, when said called terminal is reachable in VoWiFi, a location of a WiFi access point to which said called terminal is connected is also taken into account, said location being obtained from an IP address and/or from a MAC address of said access point.

15. The TAS server according to claim 12, wherein said SIP message sent to the called terminal is a SIP-type message OPTIONS.

16. A non-transitory computer-readable recording medium on which a computer program is recorded comprising instructions for executing a method for handling an incoming call intended for a called terminal in a telecommunications network, when the instructions are executed by a processor of a Telephony Application Server (TAS) server in an Internet Protocol Multimedia Subsystem (IMS) network, wherein the instructions configure the TAS server to:

interrogate a Service Data Management (SDM) entity to determine whether a service profile associated with said called terminal has Terminating Intelligent Network (IN) service marks;

interrogate an SDM entity to determine whether a routing domain to be used to route the call towards the called terminal is of a circuit or packet type; and route the call towards said called terminal;

in response to said routing domain being of the packet type, determine whether said called terminal is actually reachable in packet mode, and if so, via which type of access network; and in response to the service profile having Terminating IN marks, differentiate the Terminating IN service provided to said called terminal depending on the type of access network of the called terminal.

17. The non-transitory computer-readable recording medium according to claim 16, wherein said differentiating the Terminating IN service provided to said called terminal depending on said type of access network comprises triggering or not said Terminating IN service depending on said type of access network.

18. The non-transitory computer-readable recording medium according to claim 16, wherein said differentiating the Terminating IN service provided to said called terminal depending on said type of access network includes systematically triggering the Terminating IN service by sending to an IN service execution platform the type of access network of the called terminal, the platform being configured to implement a differentiated service logic depending on said type of access network.

19. The non-transitory computer-readable recording medium according to claim 16, wherein said determining whether the called terminal is actually reachable in packet mode and if so, via which type of access, includes:

sending a SIP message to the called terminal;

waiting for a response, for a waiting period, to determine whether said called terminal is reachable; and in case of a response:

determining said type of access network from a SIP PANI field comprised in said response.

20. The non-transitory computer-readable recording medium according to claim 19, wherein in order to differentiate the Terminating IN service provided to said called terminal, when said called terminal is reachable under cellular coverage, a country code, an operator code or a standardized cell identifier comprised in said SIP PANI field, are also taken into account.

* * * * *